(12) United States Patent
Dugic

(10) Patent No.: US 8,038,373 B2
(45) Date of Patent: Oct. 18, 2011

(54) FOLDING PALLET LATCH WITH INTEGRAL ROLLOUT PREVENTION

(75) Inventor: Edward Dugic, Navarre, FL (US)

(73) Assignee: DRS Training & Control Systems, LLC, Ft. Walton Beach, FL (US)

( * ) Notice: Subject to any disclaimer, the term of this patent is extended or adjusted under 35 U.S.C. 154(b) by 318 days.

(21) Appl. No.: 12/328,927

(22) Filed: Dec. 5, 2008

(65) Prior Publication Data

US 2010/0143063 A1 Jun. 10, 2010

(51) Int. Cl.
*B60P 1/04* (2006.01)
(52) U.S. Cl. ........................................ 410/80
(58) Field of Classification Search .............. 410/69, 410/70, 77, 80, 92, 94, 95; 414/536; 244/118.1, 244/137.1; 248/500, 503
See application file for complete search history.

(56) References Cited

U.S. PATENT DOCUMENTS

| 3,493,210 A | 2/1970 | Brenner | |
|---|---|---|---|
| 3,698,679 A | 10/1972 | Lang et al. | |
| 4,121,789 A * | 10/1978 | Lent et al. | 410/77 |
| 4,583,896 A * | 4/1986 | Vogg et al. | 410/69 |
| 5,004,387 A | 4/1991 | Jensen et al. | |
| 5,090,638 A * | 2/1992 | Eilenstein-Wiegmanns et al. | 244/118.1 |
| 5,265,991 A | 11/1993 | Herrick et al. | |
| 5,486,077 A | 1/1996 | Nutting | |
| 5,871,317 A * | 2/1999 | Huber et al. | 410/79 |
| 5,957,640 A | 9/1999 | Schmieke et al. | |
| 6,729,818 B1 * | 5/2004 | Yee et al. | 410/77 |
| 6,896,456 B2 | 5/2005 | Huber | |
| 2005/0008443 A1 | 1/2005 | Eitzenberger et al. | |
| 2007/0237598 A1 * | 10/2007 | Schulze | 410/80 |
| 2009/0016838 A1 * | 1/2009 | Roberts | 410/69 |
| 2009/0230242 A1 * | 9/2009 | Roberts | 244/118.1 |
| 2009/0324356 A1 * | 12/2009 | Schulze et al. | 410/54 |

* cited by examiner

*Primary Examiner* — H Gutman
(74) *Attorney, Agent, or Firm* — Don J. Pelto; Sheppard, Mullin, Richter & Hampton LLP

(57) ABSTRACT

A safety and restraint assembly allows transition of palletized cargo into a cargo bay and prevents the palletized cargo from inadvertently rolling backwards out through the cargo bay door. The assembly includes a wedge-shaped, spring-loaded, anti-rollout component that rotates downward as force from a pallet is applied to the anti-rollout component during loading of pallets, and the anti-rollout component returns to its original position after the pallet has traversed entirely over the anti-rollout component. The assembly also includes a folding restraint pawl for vertical restraint of adjacent pallets during transport. In an engaged position, the restraint pawl snaps into a slot in the anti-rollout component.

20 Claims, 6 Drawing Sheets

_US 8,038,373 B2_

FOLDING PALLET LATCH WITH INTEGRAL ROLLOUT PREVENTION

FIELD OF THE INVENTION

The present invention generally relates to a safety and restraint assembly for use on vehicles utilized for the transport of palletized cargo.

BACKGROUND OF THE INVENTION

The very nature of loading cargo onto airplanes, trailers, and other vehicles that transport palletized cargo is fraught with potential dangers. When pallets of cargo enter through cargo bay doors, there is a chance that the palletized cargo may inadvertently roll backwards out through the doors. Safety devices are available to prevent the cargo from rolling backwards, but quite often such safety devices must be manually adjusted after the cargo has passed through the door, then readjusted prior to entry of the next pallet of cargo, thus inhibiting the loading process. Other safety devices forego manual adjustments between pallets, but require awkward maneuvering of the cargo, such as in a direction perpendicular to the direction of entry into the cargo bay, which may also inhibit the loading process. Still other safety devices may be inadvertently initiated at the wrong time by hard impacts with the cargo pallet.

Another danger that arises in handling cargo is a result of movement of the cargo during transit. Airplanes, boats, trailers, and other vehicles that transport cargo often encounter turbulence or other obstacles that cause the cargo bay to become jostled, often tilting the pallets from a horizontal orientation to an angled orientation, which may cause the pallets to slide around the cargo bay into precarious positions. Such shifting of cargo may damage the cargo as well as endanger the cargo handlers who subsequently unload the cargo.

There is a need or desire for a safety device that allows transition of palletized cargo into a cargo bay and prevents the palletized cargo from inadvertently rolling backwards during loading as well as during transport. There is also a need or desire for a safety device that provides vertical restraint to pallets during transport.

SUMMARY OF THE INVENTION

A safety and restraint device consistent with the present invention includes a folding pallet latch with integral rollout prevention. In particular, the safety and restraint assembly for palletized cargo includes an anti-rollout component and a folding restraint pawl. The anti-rollout component rotates downward as force from a pallet is applied to the anti-rollout component during loading of pallets, and the anti-rollout component returns to its original position after the pallet has traversed entirely over the anti-rollout component. In its original position, the anti-rollout component preferably has a height that is approximately equal to or exceeds a height of the pallet relative to a top surface of the assembly and, when rotated, the height of the anti-rollout component is preferably level with or lower than the bottom surface of the pallet. In an engaged position, the restraint pawl snaps into a slot in the anti-rollout component.

The anti-rollout component and the folding restraint pawl are both disposed within a frame having a first side and a second side that is opposite the first side. During loading of pallets, a pallet begins at the first side of the frame and travels to the second side and, conversely, a pallet begins at the second side and travels to the first side during unloading of pallets. The anti-rollout component is wedge-shaped with a sloped surface that faces the first side of the frame. Thus, when a pallet approaches the sloped surface, the anti-rollout component is rotated downward by the force of the pallet moving in its travel direction. Additionally, the anti-rollout component is spring-loaded such that, in a neutral non-weight-bearing position, the anti-rollout component has a height that exceeds a height of the frame, and the anti-rollout component rotates downward during loading of pallets such that, when rotated, the height of the anti-rollout component is reduced to being level with or lower than the bottom surface of the pallet, and the anti-rollout component returns to its neutral position once any downward force exerted by any pallets has been removed from the anti-rollout component.

The restraint pawl is preferably spring-loaded. When the restraint pawl is in a neutral disengaged position, a latching end of the restraint pawl is positioned between the sloped surface of the anti-rollout component and the first side of the frame, and the latching end of the restraint pawl is level with or lower than the height of the frame. As mentioned above, when the restraint pawl is in an engaged position, the restraint pawl snaps into a slot in the anti-rollout component. The restraint pawl can be released from the slot through the application of pressure to the anti-rollout component.

In certain embodiments, the slot in the anti-rollout component may be formed between two substantially vertical walls each parallel with the first and second sides of the frame, namely a first wall that meets the sloped surface of the anti-rollout component and a second wall positioned between the first wall and the second side of the frame. The first wall is preferably taller than the second wall. A length of the restraint pawl, when parallel with a length of the slot, is greater than the length of the slot such that the restraint pawl extends above the slot. The latching end of the restraint pawl is L-shaped and, in the engaged position, a distal end of the L-shaped latching end extends from above the second wall of the anti-rollout component toward or beyond the second side of the frame.

The safety and restraint assembly may also include a mechanical toggle that locks the anti-rollout component in a non-obstructing position in which a height of the anti-rollout component is level with or lower than a top surface of the assembly, or lower than the height of the frame.

The safety and restraint assembly is preferably located within a cargo bay near a door of the cargo bay, thus allowing transition of palletized cargo into the cargo bay and preventing the palletized cargo from inadvertently rolling backwards out through the door. The assembly is preferably located within a cargo bay of a vehicle utilized for transport of palletized cargo, such as an aircraft, a trailer, a boat, or the like.

In accordance with devices consistent with the present invention, a safety and restraint assembly capable of allowing the transition of palletized cargo into a cargo bay while preventing the palletized cargo from inadvertently rolling backwards during loading is provided. Such an assembly also provides vertical restraint to pallets during transport.

Other apparatus, features and advantages of the present invention will be or will become apparent to one having skill in the art upon examination of the following figures and detailed description. It is intended that all such additional apparatus, features and advantages be included within this description, be within the scope of the present invention, and be protected by the accompanying drawings.

DETAILED DESCRIPTION OF THE INVENTION

Reference will now be made in detail to an implementation in accordance with methods, systems, and articles of manufacture consistent with the present invention as illustrated in the accompanying drawings. The same reference numbers may be used throughout the drawings and the following description to refer to the same or like parts.

A safety and restraint assembly consistent with the present invention allows the transition of palletized cargo into a cargo bay while preventing the palletized cargo from inadvertently rolling backwards during loading, and further provides vertical restraint to pallets during transport. The assembly can be used on aircraft, trailers, boats, and other vehicles utilized for the transport of palletized cargo. More particularly, the assembly can be located within a cargo bay, near a door of the cargo bay, and can allow palletized cargo to be transported into the cargo bay while simultaneously preventing the palletized cargo from inadvertently rolling backwards out through the door.

Figure 1:
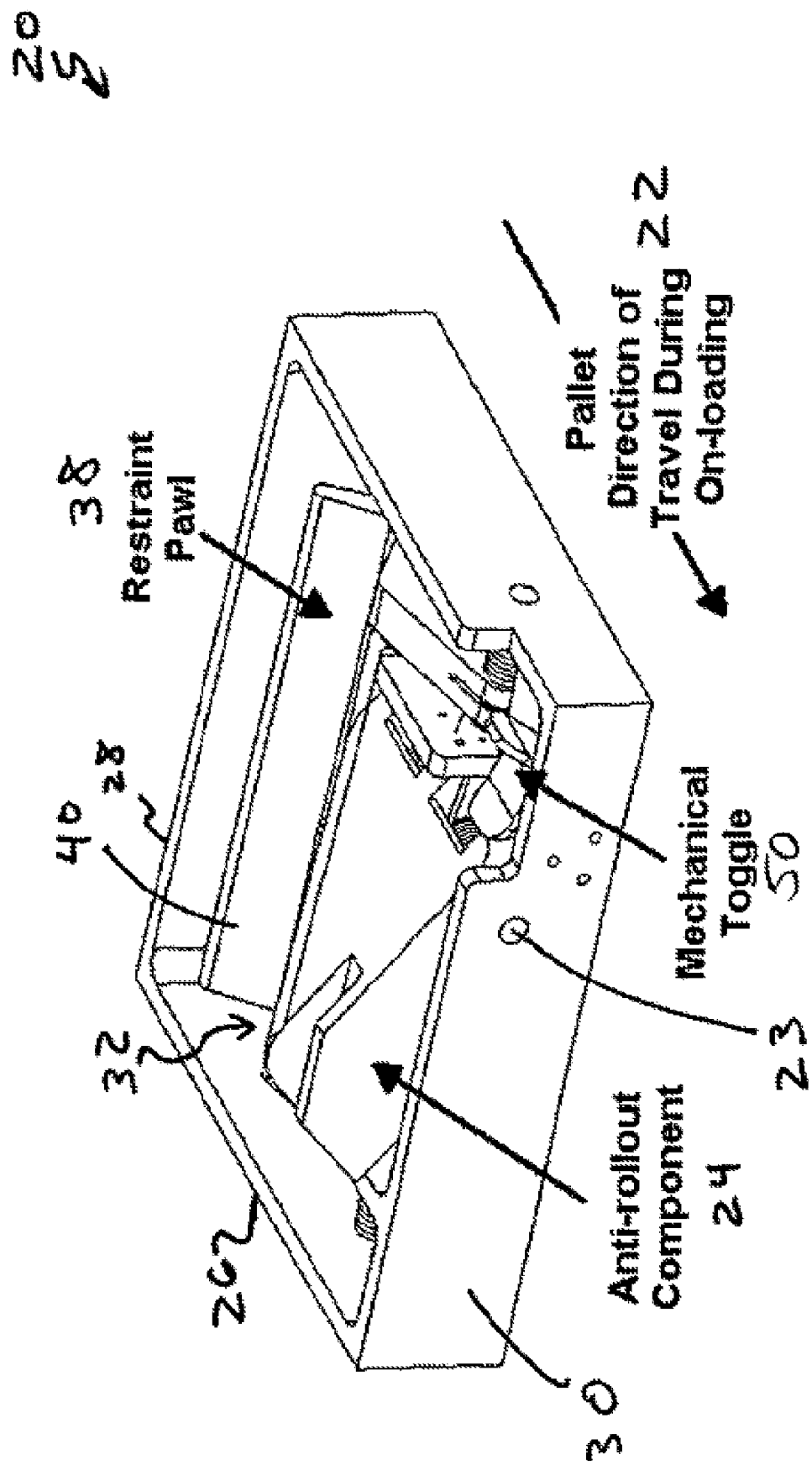
FIG. 1 depicts a safety and restraint assembly in a cargo loading configuration.

Referring to FIG. 1, an illustrative safety and restraint assembly is depicted at 20. Arrow 22 indicates the direction in which pallets travel during the loading of cargo into the cargo bay. The assembly 20 includes a wedge-shaped anti-rollout component 24 that will rotate downward about axis 23 and out of the way during loading of pallets. The anti-rollout component 24 is disposed within a frame 26. During the loading of cargo in the direction of arrow 22, the palletized cargo first approaches a first side 28 of the frame 26 and travels across the assembly 20 toward a second side 30 of the frame 26.

Figure 2:
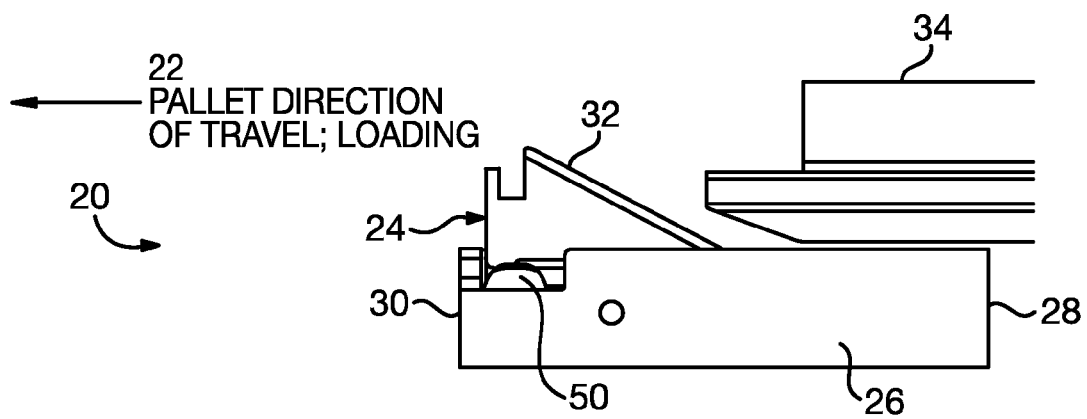
FIG. 2 is a side view of a safety and restraint assembly in a cargo loading configuration.

The anti-rollout component 24 is spring-loaded such that in its original or neutral non-weight-bearing position the anti-rollout component 24 protrudes above a top surface of the assembly 20, as illustrated in FIG. 2. The top surface of the assembly 20 can be defined by a top surface of the frame 26 in which the anti-rollout component 24 is disposed. The height of the anti-rollout component 24 is determined by a highest point of the anti-rollout component 24 in any position.

Figure 3:
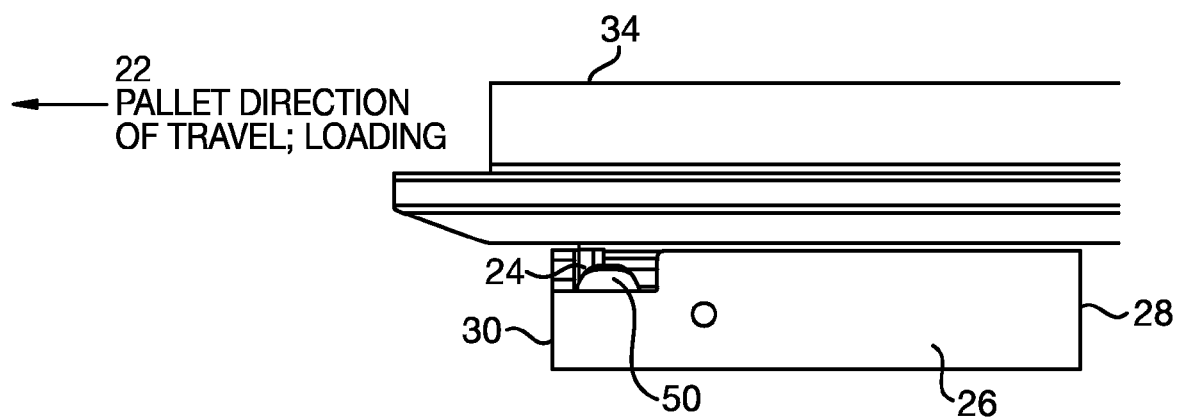
FIG. 3 is a side view of a safety and restraint assembly beneath a pallet in a cargo loading configuration.

The anti-rollout component 24 has a sloped surface 32 facing the first side 28 of the frame 26. Thus, during loading when a pallet 34 traveling in the direction indicated by arrow 22 approaches the anti-rollout component 24, the pallet 34 encounters the sloped surface 32 and the force from the pallet 34 proceeds to push the anti-rollout component 24 downward, as illustrated in FIG. 3. Because of the sloped surface 32, the anti-rollout component 24 rotates downward as a result of forces exerted in the same direction as pallet travel during loading of the pallets, thus obviating any need to change the course of travel of the pallets. Furthermore, the sloped interface between the anti-rollout component 24 and the pallet 34 provides for a smooth transition between the original position and the downward-rotated position of the anti-rollout component 24, which obviates any need to initiate the rotation of the anti-rollout component 24 with a hard impact by the cargo pallet 34. When rotated downward, the height of the anti-rollout component 24 is reduced to being level with or lower than the bottom surface of the pallet 35, which allows the pallet 34 to smoothly pass over the assembly 20 without interrupting the loading process.

Figure 4:
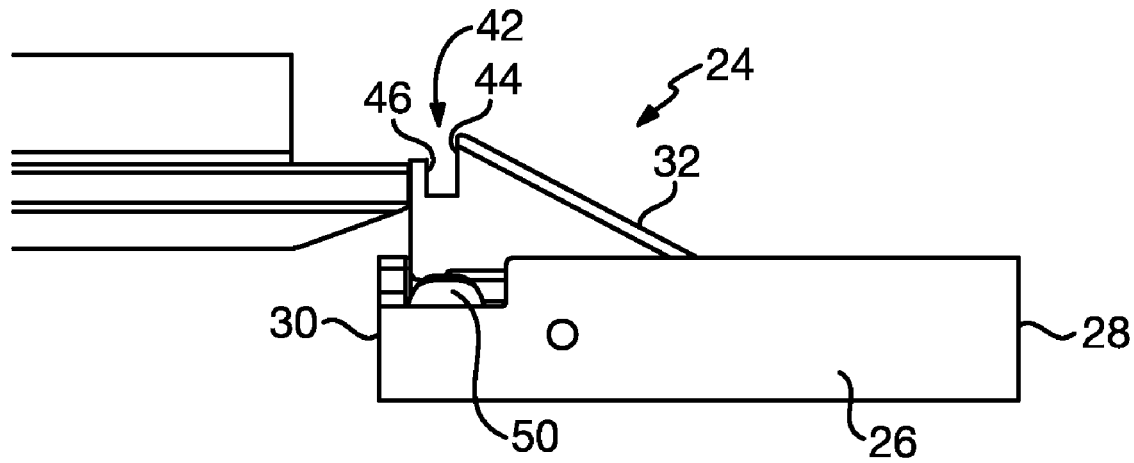
FIG. 4 is a side view of a safety and restraint assembly illustrating an anti-rollout feature.

Once any downward forced exerted by any pallets has been removed from the anti-rollout component 24, namely after the pallet 34 has traversed entirely over the anti-rollout component 24, the spring-loaded anti-rollout component 24 returns to its original or neutral position and blocks the cargo 34 from backing up, as shown in FIG. 4. The anti-rollout component 24 may remain in its original position during transport, thus providing lateral or aft restraint to the pallet 34.

Figure 5:
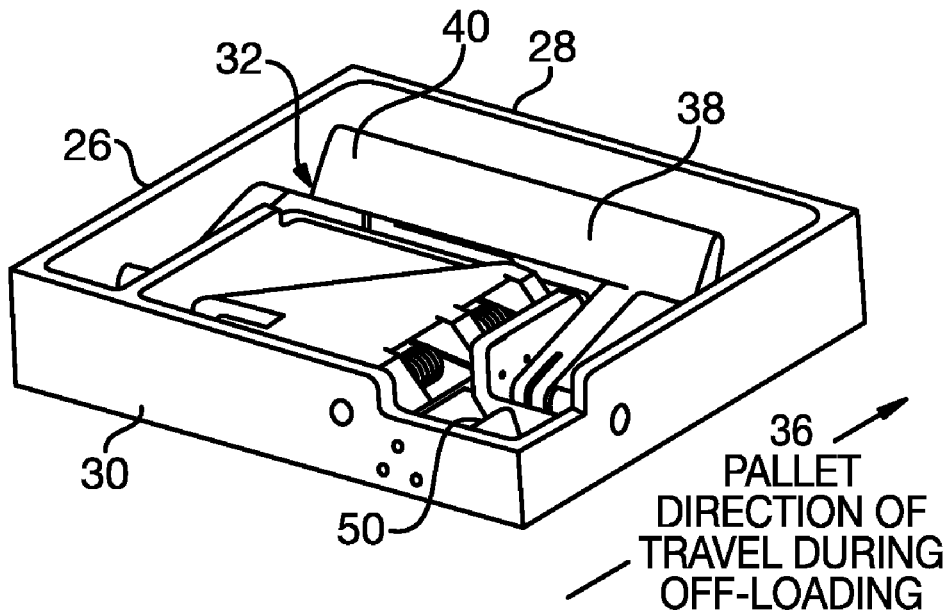
FIG. 5 depicts a safety and restraint assembly in a cargo off-loading configuration.
Figure 6:
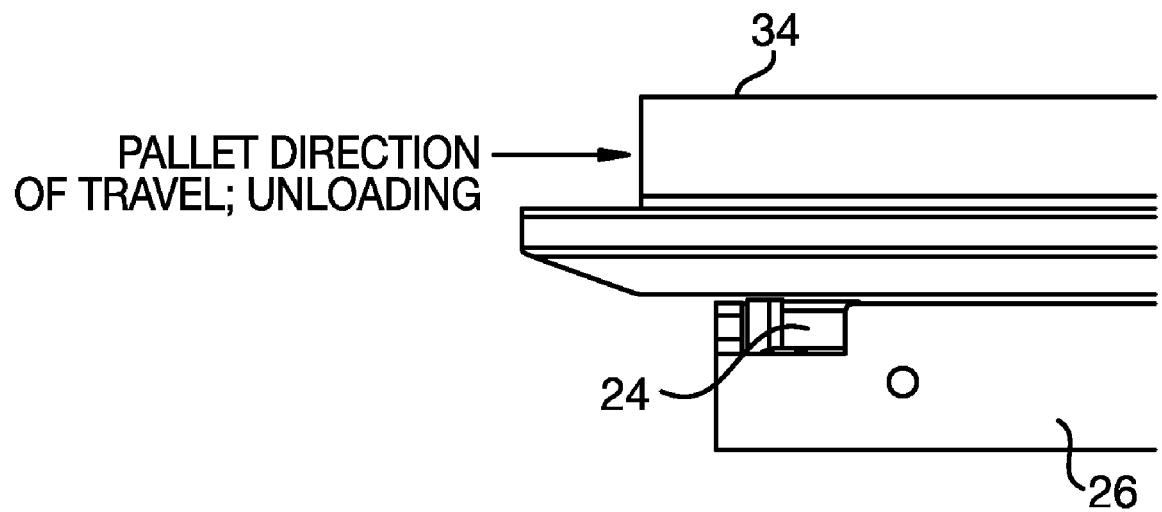
FIG. 6 is a side view of a safety and restraint assembly in a cargo unloading configuration with a toggle engaged.

As illustrated in FIGS. 1 and 5, the assembly 20 may include a mechanical toggle 50 that locks the anti-rollout component 24 in a non-obstructing position in which the height of the anti-rollout component 24 is level with or lower than the bottom surface of the pallet 35. This non-obstructing position is particularly suitable for pallet off-loading, which entails transporting pallets in the direction of arrow 36 in FIGS. 5 and 6. More particularly, during the unloading process in the direction of arrow 36, the palletized cargo first approaches the second side 30 of the frame 26 and travels across the assembly 20 toward the first side 28 of the frame, and subsequently out the door of the cargo bay.

Figure 7:
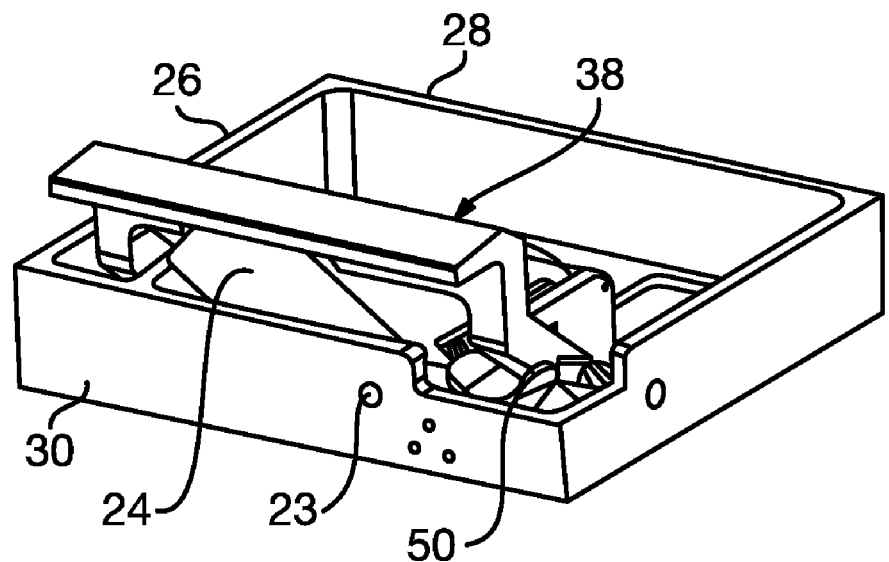
FIG. 7 depicts a safety and restraint assembly in a cargo transport configuration.

The assembly 20 may also include a folding restraint pawl 38 to provide vertical restraint to adjacently located pallets during transport. FIGS. 1 and 7 depict a folding restraint pawl 38 disposed within the frame 26 in disengaged and engaged positions, respectively. The restraint pawl 38 may be akin to those used in military and commercial style pallet restraints, with additional interlocking features with the anti-rollout component 24, as explained below.

When the restraint pawl 38 is in a neutral disengaged position, as depicted in FIG. 1, a latching end 40 of the restraint pawl 38 is positioned between the sloped surface 32 of the anti-rollout component 24 and the first side 28 of the frame 26, and the latching end 40 of the restraint pawl 38 is level with or lower than the height of the frame 26. The restraint pawl 38 may be engaged by raising the restraint pawl 38 upward and snapping the restraint pawl 38 into a slot 42 in the anti-rollout component 24. The slot 42 is formed between two substantially vertical walls each parallel with the first and second sides 28, 30 of the frame 26. As best illustrated in FIG. 4, a first wall 44 meets the sloped surface 32 of the anti-rollout component 24 and a second wall 46 is positioned between the first wall 44 and the second side 30 of the frame 26. The first wall 44 is preferably taller than the second wall 46.

Figure 8:
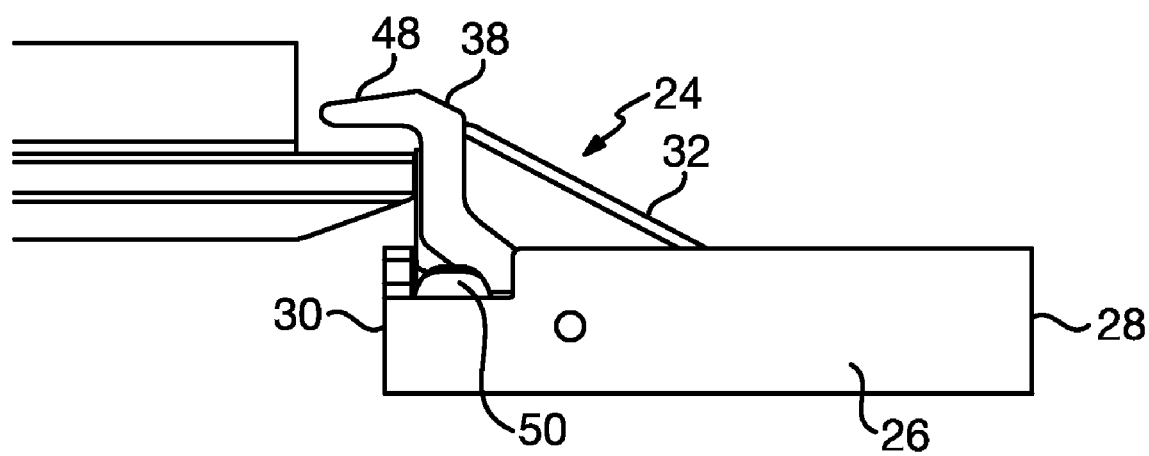
FIG. 8 is a side view of a safety and restraint assembly in a cargo transport configuration.

As depicted in FIGS. 4, 7 and 8, when the restraint pawl 38 is in the engaged position, a length (or height) of the restraint pawl 38 when parallel with a length (or height) of the slot 42 is greater than the length of the slot 42 such that the restraint pawl 38 extends above the slot 42. Furthermore, the latching end 40 of the restraint pawl 38 is preferably L-shaped such that, in the engaged position, a distal end 48 of the latching end 40 extends from above the second wall 46 of the anti-rollout component 24 toward or beyond the second side 30 of the frame 26. In the engaged position, the latching end 40 of the restraint pawl 38 is designed to provide vertical restraint to pallets 34 during transport, as shown in FIG. 8.

Like the anti-rollout component 24, the restraint pawl 38 may also be spring-loaded. The restraint pawl 38 may be released from the slot 42 in the anti-rollout component 24 through the application of pressure to the anti-rollout component 24, such as by stepping on the anti-rollout component 24 to allow the restraint pawl 38 to return to its disengaged position for pallet off-loading, as depicted in FIG. 5.

Figure 9:
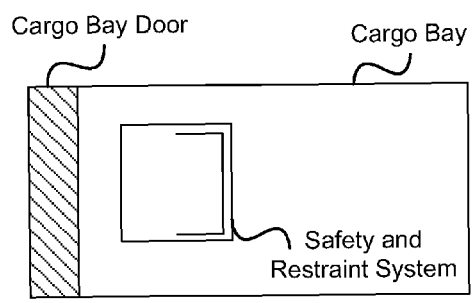
FIG. 9 is a view of a safety and restraint assembly in a cargo bay near the cargo bay door.

FIG. 9 is a view of a safety and restraint assembly in a cargo bay near the cargo bay door in some embodiments.

Figure 10:
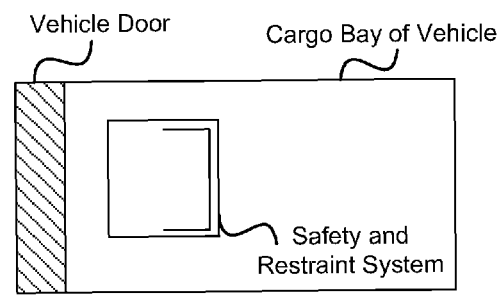
FIG. 10 is a view of a safety and restraint assembly in a cargo bay of a vehicle.

FIG. 10 is a view of a safety and restraint assembly in a cargo bay of a vehicle in some embodiments.

Figure 11:
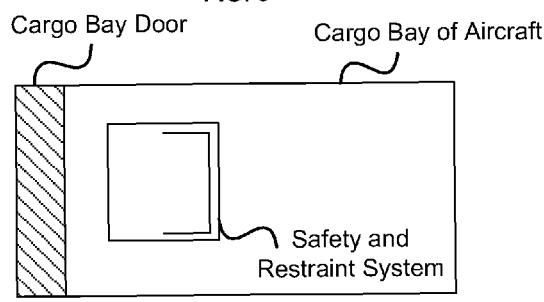
FIG. 11 is a view of a safety and restraint assembly in a cargo bay of an aircraft.

FIG. 11 is a view of a safety and restraint assembly in a cargo bay of an aircraft in some embodiments.

Figure 12:
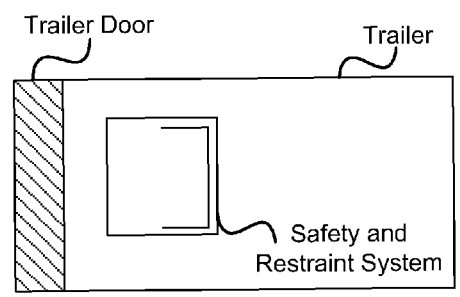
FIG. 12 is a view of a safety and restraint assembly in a trailer.

FIG. 12 is a view of a safety and restraint assembly in a trailer in some embodiments.

Figure 13:
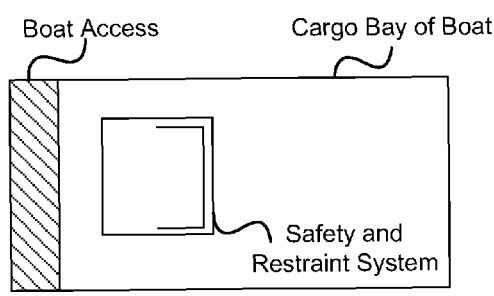
FIG. 13 is a view of a safety and restraint assembly in a cargo bay of a boat.

FIG. 13 is a view of a safety and restraint assembly in a cargo bay of a boat in some embodiments.

The foregoing description of an implementation of the invention has been presented for purposes of illustration and description. It is not exhaustive and does not limit the invention to the precise form disclosed. Modifications and variations are possible in light of the above teachings or may be acquired from practicing the invention. The scope of the invention is defined by the claims and their equivalents.

What is claimed is:

1. A safety and restraint assembly for palletized cargo, the assembly comprising:
    a wedge-shaped, spring-loaded, anti-rollout component that rotates downward as force from a pallet is applied to the anti-rollout component during loading of pallets, and the anti-rollout component returns to its original position after the pallet has traversed entirely over the anti-rollout component; and
    a folding restraint pawl;
    wherein, in an engaged position, the restraint pawl snaps into a slot in the anti-rollout component.

2. The safety and restraint assembly of claim 1, wherein the anti-rollout component rotates downward in response to a force moving in the same direction as pallet travel during the loading of pallets.

3. The safety and restraint assembly of claim 1, wherein, in its original position, the anti-rollout component has a height that is approximately equal to or exceeds a height of the pallet relative to a top surface of the assembly and, when rotated, the height of the anti-rollout component is level with or lower than the bottom surface of the pallet.

4. The safety and restraint assembly of claim 1, wherein the restraint pawl is spring-loaded.

5. The safety and restraint assembly of claim 1, wherein the restraint pawl is released from the slot in the anti-rollout component through the application of pressure to the anti-rollout component.

6. The safety and restraint assembly of claim 1, further comprising a mechanical toggle that locks the anti-rollout component in a non-obstructing position in which a height of the anti-rollout component is level with or lower than a bottom surface of the pallet.

7. The safety and restraint assembly of claim 1, wherein the assembly is located within a cargo bay near a door of the cargo bay.

8. The safety and restraint assembly of claim 7, wherein the assembly allows transition of palletized cargo into the cargo bay and prevents the palletized cargo from inadvertently rolling backwards out through the door.

9. The safety and restraint assembly of claim 1, wherein the assembly is located within a cargo bay of a vehicle utilized for transport of the palletized cargo.

10. The safety and restraint assembly of claim 1, wherein the assembly is located within an aircraft.

11. The safety and restraint assembly of claim 1, wherein the assembly is located on a trailer.

12. The safety and restraint assembly of claim 1, wherein the assembly is located within a boat.

13. A safety and restraint assembly for palletized cargo, the assembly comprising:
    a frame having a first side and a second side opposite the first side, wherein a first pallet begins at the first side and travels to the second side during loading of pallets and, conversely, a second pallet begins at the second side and travels to the first side during unloading of pallets;
    an anti-rollout component disposed within the frame, the anti-rollout component having a sloped surface facing the first side of the frame, the anti-rollout component being spring-loaded such that, in a neutral non-weight-bearing position, the anti-rollout component has a height that exceeds a height of the frame, and the anti-rollout component rotates downward during the loading of pallets such that, when rotated, the height of the anti-rollout component is reduced to being level with or lower than the bottom surface of the loading pallets, and the anti-rollout component returns to its neutral position once a downward force exerted by any of the loading pallets has been removed from the anti-rollout component;
    a folding restraint pawl disposed within the frame, when the restraint pawl is in a neutral disengaged position, a latching end of the restraint pawl is positioned between the sloped surface of the anti-rollout component and the first side of the frame, and the latching end of the restraint pawl is level with or lower than the height of the frame;
    wherein, in an engaged position, the restraint pawl snaps into a slot in the anti-rollout component.

14. The safety and restraint assembly of claim 13, wherein the slot in the anti-rollout component is formed between two substantially vertical walls each parallel with the first and second sides of the frame, a first wall that meets the sloped surface of the anti-rollout component and a second wall positioned between the first wall and the second side of the frame, the first wall being taller than the second wall.

15. The safety and restraint assembly of claim 14, wherein a length of the restraint pawl, when parallel with a length of the slot, is greater than the length of the slot such that the restraint pawl extends above the slot.

16. The safety and restraint assembly of claim 14, wherein the latching end of the restraint pawl is L-shaped and, in the engaged position, a distal end of the L-shaped latching end extends from above the second wall of the anti-rollout component toward or beyond the second side of the frame.

17. The safety and restraint assembly of claim 13, wherein the restraint pawl is spring-loaded.

18. The safety and restraint assembly of claim 13, wherein the restraint pawl is released from the slot in the anti-rollout component through the application of pressure to the anti-rollout component.

19. The safety and restraint assembly of claim 13, further comprising a mechanical toggle that locks the anti-rollout component in a non-obstructing position in which the height of the anti-rollout component is level with or lower than the height of the frame.

20. The safety and restraint assembly of claim 13, wherein the assembly is located within a cargo bay of a vehicle utilized for transport of the palletized cargo.

* * * * *